(12) United States Patent
Carter et al.

(10) Patent No.: US 6,819,877 B1
(45) Date of Patent: Nov. 16, 2004

(54) OPTICAL LINKS

(75) Inventors: Andrew C Carter, Blisworth (GB); Colin Edge, Weston Favell (GB)

(73) Assignee: Bookham Technology PLC, Oxfordshire (GB)

( * ) Notice: Subject to any disclaimer, the term of this patent is extended or adjusted under 35 U.S.C. 154(b) by 0 days.

(21) Appl. No.: 09/601,524
(22) PCT Filed: Feb. 5, 1999
(86) PCT No.: PCT/GB99/00376
§ 371 (c)(1), (2), (4) Date: Sep. 21, 2000
(87) PCT Pub. No.: WO99/40696
PCT Pub. Date: Aug. 12, 1999

(30) Foreign Application Priority Data

Feb. 5, 1998 (GB) ............................................. 9802445

(51) Int. Cl.[7] ........................... H04B 10/04; H04B 10/06
(52) U.S. Cl. ...................... 398/186; 398/183; 398/184; 398/198; 398/200; 398/214
(58) Field of Search ................................ 398/141, 159, 398/183, 184, 186, 189, 194, 198, 200, 214, 185, 187, 188

(56) References Cited

U.S. PATENT DOCUMENTS 5,283,679 A    2/1994  Wedding
5,745,274 A  * 4/1998  Fatehi et al. ................. 398/198

FOREIGN PATENT DOCUMENTS

EP  0 201 370     12/1986
FR  80 14288      12/1981
FR  81 03905       9/1982
WO  WO 82/02632  * 8/1982 ............ H04B/9/00

* cited by examiner

Primary Examiner—M. R. Sedighian
(74) Attorney, Agent, or Firm—Kirschstein, et al.

(57) ABSTRACT

An optical link is operative for transmitting a microwave signal in modulated optical form over an optical fiber. The optical link has a transmitter and a receiver. The transmitter splits and converts the microwave signal into two separate optical signals, each of which represents either the positive varying part of the microwave signal or the negative varying part of the microwave signal. The receiver combines the two separate optical signals and converts them back into the microwave signal.

9 Claims, 2 Drawing Sheets

US 6,819,877 B1

OPTICAL LINKS

BACKGROUND OF THE INVENTION

This invention relates to optical links and is more especially, although not exclusively, concerned with high performance optical link configurations including wideband and/or high dynamic range optical links.

An optical link comprises an optical transmitter for transmitting a light signal along an optical path and an optical receiver for receiving the light signal. Such links can be used to transmit signals originating in parts of the electromagnetic spectrum having frequencies lower than that of the light signal. They may be used to convert microwave signals in the range from RF to millimeter wave into light signals and then transmit them.

Conventionally, wideband optical links are direct detection (DD) systems which use intensity modulated light sources. The performance of such (DD) links is usually limited by thermal noise in the optical receiver when low optical power levels are used and by optically generated noise (such as shot noise and relative intensity noise (RIN)) when high optical power levels are received.

In high performance optical links, whether digital or analogue, output wideband noise is largely caused by optically generated noise. An optical carrier from a light source is intensity modulated with the signal which it is to carry. In many cases the modulated optical power is much less than mean optical power from the light source, in which case there is a considerable level of standing optical power contributing to the noise and not to the signal.

Alternative methods of reducing the noise contribution from the unmodulated optical signal, such as bias offset or carrier filtering, result in a reduced modulation efficiency and an increased second order distortion making the optical link unsuitable for wideband systems.

In the known intensity modulated links, light from the source is incident on photodiodes in the optical receiver even if the optical transmitter is not receiving a modulating signal. In this event, a noise floor will always be present provided by optically generated noise. This restricts the dynamic range (DR) of the link.

The operation of high dynamic range, wideband optical links is defined with certain parameters including compression dynamic range (CDR) and spurious free dynamic range (SFDR). CDR is defined as the signal-to-noise ratio (SNR) at the 1 dB compression point For every 1 dB improvement in the noise level the CDR increases by 1 dB. SFDR is defined as the SNR at the driver power when the largest spurious tone equals the noise floor. This is generally specified for the two-tone third-order intermodulation signal. SFDR increases by 0.66 dB for every 1 dB improvement in the noise level.

Many potential applications for wideband optical links require a dynamic range of at least 10 dB better than can currently be realised. To achieve this performance it is necessary either to improve linearity of modulation which is applied to the light source or to reduce the noise floor.

To increase the signal noise ratio in an optical link for transmitting analogue signals it has been proposed in FR 2500972 to transmit the optical signal in the form of two optical signals: a first optical signal corresponding with at least a positive half wave of the signal to be transmitted and a second optical signal corresponding with at least a negative half-wave of the signal. Firstly the electrical signal is split into two electrical signals corresponding to the positive and negative half-waves and these are used to drive a respective LED to generate the two optical signals. The optical signals are then transmitted by a respective optical fibre to a pair of photodiodes which convert them back to electrical signals and combines them to form an electrical signal representative of the original signal. FR 2500972 states that the use of a symmetrical assembly of photodiodes in this way improves the signal to noise ratio since the signals add whilst the noise cancels.

The inventors have appreciated that whilst such an arrangement can offer an improved noise performance the bandwidth of the signal it is able to transmit is limited by the need to firstly convert the electrical signal into two electrical signals. The present invention arose in an endeavour to provide an optical link which at least in part solves this problem.

SUMMARY OF THE INVENTION

According to a first aspect of the invention an optical link comprises: an optical transmitter for generating intensity modulated optical radiation in dependance on an original electrical signal; an optical path for transmitting the modulated optical radiation; and demodulating means for converting the optical radiation into an output electrical signal representative of the original electrical signal; wherein the original electrical signal has an amplitude which varies from positive values to negative values and wherein the modulated optical radiation comprises a first varying optical signal representing a positive varying component of the original electrical signal and a second varying optical signal representing a negative varying component of the original electrical signal, the optical path carrying the first and second varying optical signals to the demodulating means which converts them into the output electrical signal; characterised by the optical transmitter comprising: a first optical modulator; a second optical modulator and a light source associated with the first and second optical modulators; the light source being operable to produce an unmodulated optical output and the first and second modulators being operable to intensity modulate the optical output in dependence on the original electrical signal to respectively produce the first and second varying optical signals; wherein each modulator has an optical transmission versus voltage characteristic having a substantially linear region and a threshold voltage above or below which substantially no light is transmitted by the modulator; and further comprising biasing means for biasing the first and second modulators to operate on a selected portion of said characteristic such that the first modulator is operable for positive varying components of the original signal and the second modulator is operable for negative varying components of the optical signal.

Generating each optical signal from the original signal using a separate modulator and associated light source in the way described eliminates the need to convert the original electrical signal and improves the bandwidth of the optical link. The bandwidth of the optical link of the present invention is determined by the operating speed of the modulator rather than electronic components which would otherwise be required to convert the electrical signal.

Preferably the optical path comprises an optical fibre. The first and second varying optical signals can be differentiated by having different wavelengths or different polarisation.

Thus in one embodiment the light source is operable to produce a first wavelength optical output which is applied to the first modulator and a second wavelength optical output which is applied to the second modulator such that the first and second varying optical signals have different wavelengths. Alternatively or in addition the optical fibre is polarising maintaining and the optical link further comprises means for placing one of the varying optical signals in a different polarisation state to that of the other before transmission along said fibre with such an arrangement the demodulating means includes a polarisation splitter for distinguishing between the first and second varying optical signals.

In one embodiment at least one of the modulators comprises an electro-absorption modulator. Preferably at least one the modulators comprises a series of cascaded electro-optic modulators to produce the desired modulator characteristic. It can be an interferometer.

Preferably the demodulator comprises first photoreceiver for converting the first varying optical signal into, the positive varying component and a second photoreceiver for converting the second varying optical signal into the negative varying component and means for combining the two components to produces the output electrical signal. Conveniently the second photoreceiver extracts the negative varying component in anti-phase to the first photoreceiver which extracts the positive varying component.

Preferably the original electrical signal is a microwave signal, radar signal or communication signal. It can be a television signal. The original electrical signal can originate from cable based or antenna based systems used in communication or radar systems.

According to a second aspect of the invention provides a method of transmitting an original electrical signal as an optical signal over an optical link in accordance the first aspect of the invention.

BRIEF DESCRIPTION OF THE DRAWINGS

An embodiment of the invention will now be described by way of example only with reference to the accompanying drawings in which.

DETAILED DESCRIPTION OF THE PREFERRED EMBODIMENTS

Figure 1:
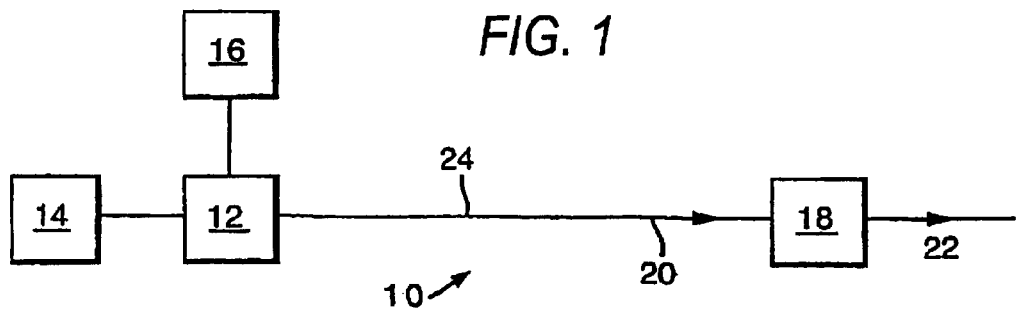
FIG. 1 shows a schematic representation of an optical link.

FIG. 1 shows a schematic representation of an optical link 10 which has an optical modulator 12 for modulating light from a light source 14 with an original varying electrical signal 16 and a demodulator 18 for converting a received optical signal 20 into an electrical signal 22 which is a reproduction of the original varying electrical signal 16. The original varying electrical signal 16 is an external signal which is to be transmitted over the link 10. It may be a communication signal or it may originate from a radar antenna The link 10 may be being used to send the original varying electrical signal 16 to processing means which are remote from the source of the original varying electrical signal 16 for signal processing. The optical signal 20 is transmitted from the modulator 12 to the demodulator 18 via an optical fibre 24.

Figure 2:
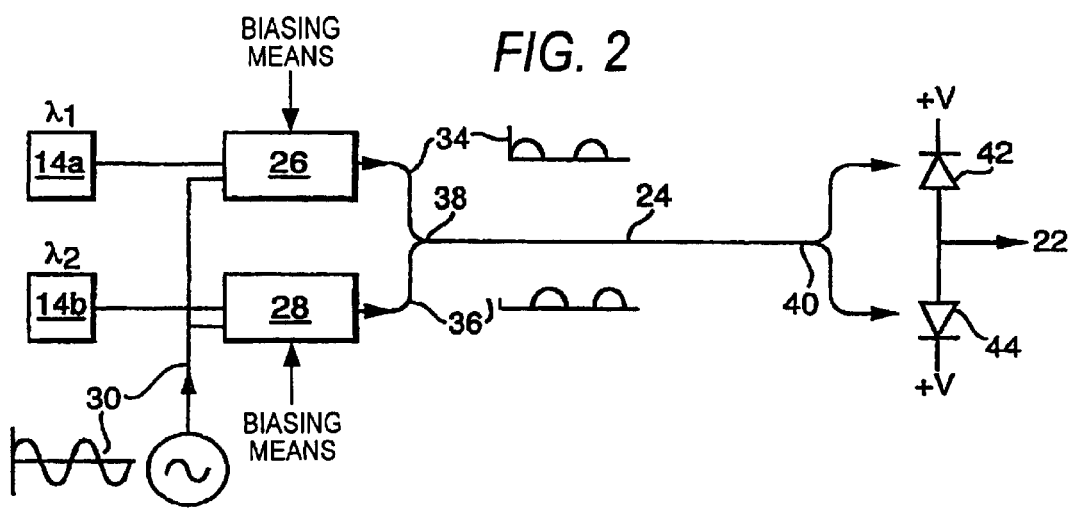
FIG. 2 shows a schematic representation of a modulator.

Referring now to FIG. 2, this shows further detail of the modulator 12. The light source 14 comprises first and second light sources 14a and 14b which produce light at different wavelengths $\lambda_1$ and $\lambda_2$ respectively. In one embodiment they are semiconductor lasers operating around 1.55 $\mu$m. The first light source 14a supplies a first sub-modulator 26 and the second light source 94b supplies a second sub-modulator 28. The sub-modulators are each fed with a modulating signal 30 which is the original electrical varying signal. The voltage of the modulating signal 30 varies in magnitude and has positive and negative a more complicated signal would be present.

The sub-modulator 26 is configured such that it modulates light from the light source 14a only when the modulating signal is varying in a range between zero and a positive value. The sub-modulator 28 is configured such that it modulates light from the light source 14b only when the modulating signal is varying in a range between zero and a negative value.

Figure 3:
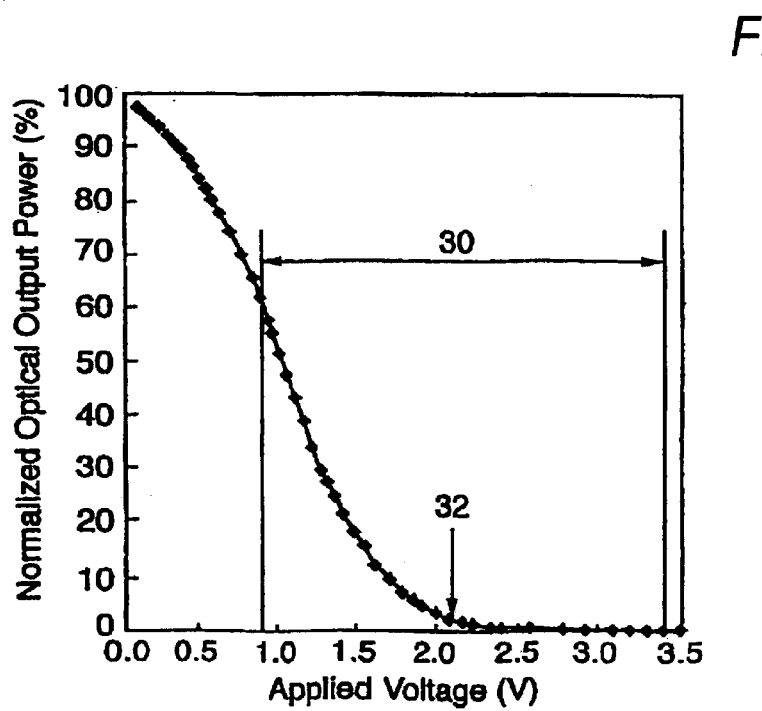
FIG. 3 shows operating characteristics of the modulator of FIG. 2.

Operation of the sub-modulators 26 and 28 is best explained with reference to FIG. 3. This is a graph showing the operating characteristics of an electro-absorption modulator device which is an integral part of each of the sub-modulators 26 and 28. The graph is a plot of optical transmission against voltage. At low voltages most or all of the light is transmitted until a threshold voltage is reached at which no light is transmitted. In order to minimise distortion of the transmitted light, particularly if it is modulated with analogue signals, it is preferred that the device is operated in an operating region where there is a linear relationship between transmission and voltage. As has been explained in the foregoing, each sub-modulator 26, 28 modulates light only when either a positive or a negative voltage is applied. Therefore operating region 30 is defined by biasing the modulator with a fixed DC voltage in order to obtain the desired operating characteristics. As an example, the sub-modulator 28 is biased such that its nominal 0V point is at point 32. As a result, it will only transmit light when a negative voltage is applied and will not transmit light when a positive voltage is applied. Since there is a modulated linear transmission/voltage relationship below point 32, the sub-modulator 28 produces a modulated light signal 36 which is a direct analogue of the negative part of the original varying electrical signal.

It is straightforward to configure the sub-modulator 26 so that it only produces a response for positive applied voltages. In order to obtain what is effectively the mirror-image of the operating characteristics of FIG. 3, the drive signal of the sub-modulator 26 is inverted. That is, the sub-modulators 26 and 28 are driven in anti-phase to each other. Suitable biasing provides a nominal 0V point below which the sub-modulator 26 will not transmit light and above which it will transmit light in proportion to the applied voltage.

The level of second order distortion in the reproduced original varying electrical signal can be controlled and thus reduced to a negligible level provided that there is no phase or amplitude imbalance between the first and second varying optical signals when they are detected.

The sub-modulators 26 and 28 produce respective modulated optical signals 34 and 36 at different wavelengths $\lambda_1$ and $\lambda_2$. In this example schematic waveforms are shown approximating to those which would be generated if the original varying electrical signal 16 is a sine wave. Obviously, since it is not possible to have "negative" light, both optical signals 34 and 36 have positive values. These signals are multiplexed onto the optical fibre 24 with a coupler 38.

In this embodiment, the optical fibre 24 requires no special properties and so can be of a conventional type. The invention is therefore particularly suitable for use in upgrading existing optical links. At the demodulator, a wavelength dependent coupler 40 is used to separate, that is demultiplex, the two signals 34 and 36.

The two optical signals are transported to the demodulator 18 which comprises a suitable photoreceiver. In a preferred embodiment the photoreceiver consists of two photodiodes 42 and 44 configured so as to produce a combined output 22 which is identical to the original varying electrical signal 16. As shown in FIG. 2 both photodiodes are reverse biased and are connected back to back, that is their cathodes are connected together and the combined output 22 is derived from the common connection.

Figure 4:
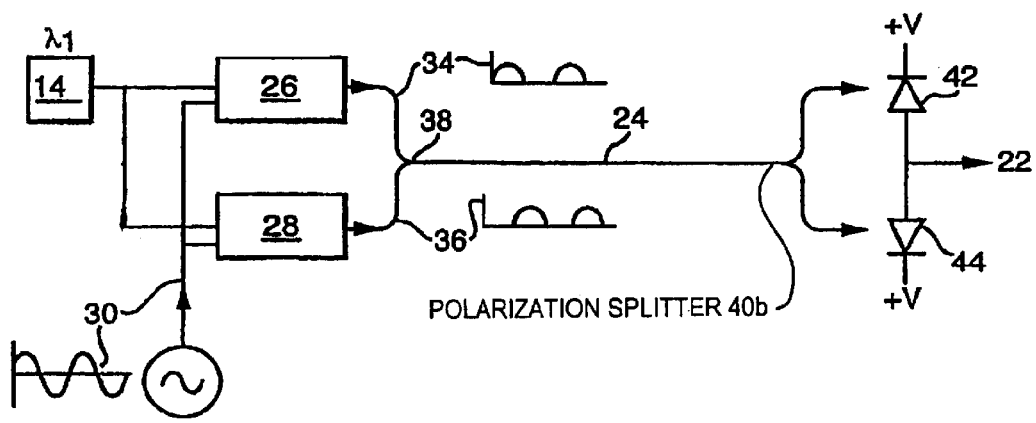

In the embodiment shown in FIG. 2 the sub-modulators 26 and 28 use different light sources 14a and 14b which supply light at different wavelengths. However, in the embodiment shown in FIG. 4, a single light source 14 is used to supply light to each of the sub-modulators. The single light source supplies an optical coupler which has output ports connected to each of the sub-modulators. In this embodiment, the two signals 34 and 36 are of the same wavelength and so need to be differentiated in some way. This can be done by placing them in different polarisation states such as orthogonal polarisation states. The signals 34 and 36 are then transmitted in a polarising maintaining (PM) fibre which maintains their polarisation states by each having a different propagation velocity. A typical PM fibre will produce a time delay error of less than 0.6 ps if it is less than 0.5 m long. This is equivalent to a phase error of 4°. It is therefore necessary to compensate for this effect. One technique is to cut the PM fibre in half and splice the halves together with a 90° rotation to swap the polarisation modes in the fibre. Demultiplexing at the demodulator 18 requires a polarisation splitter device such as a polarising beam splitter 40b.

Of course, the sub-modulators 26 and 28 can send their respective optical signals down respective optical fibres to avoid the need for multiplexing and demultiplexing. However, a single optical fibre 24 is preferred to reduce the likelihood of there being a path length imbalance.

The SNR of such an optical link is greater than alternative approaches because there is substantially no unmodulated optical power arriving at either photodiode. Compared to a typical high performance optical link the invention can improve the SNR by more than 10 dB.

The mean optical power on either photodiode is relatively small, because it is dependent only upon the magnitude of the modulating signal. This means that the noise power out of the links is not constant, but rather varies with drive power. The limiting noise power at low signal levels is now the thermal noise of the photoreceiver, which means that the dynamic range is increased relative to the known optical links. Optically generated noise (shot noise and RIN) is therefore only apparent at very high drive powers.

The invention may provide an optical link in which the CDR can be increased due to reduced optical power being dejected by the detector. At present the known direct detection links are limited since the mean optical power they detect is close to the compression limit of each photodiode. In contrast in the optical link of the present invention the mean optical power is reduced and therefore the source power can be increased thereby increasing the CDR by a corresponding amount.

The invention provides an optical link configuration which minimises the level of standing optical power in a modulated optical signal and therefore minimises optically generated noise power.

What is claimed is:

1. An optical link comprising: an optical transmitter for generating intensity modulated optical radiation in dependence on an original electrical signal; an optical path for transmitting the modulated optical radiation; and demodulating means for converting the optical radiation into an output electrical signal representative of the original electrical signal; the original electrical signal having an amplitude which varies from positive values to negative values; the modulated optical radiation including a first varying optical signal representing a positive varying component of the original electrical signal, and a second varying optical signal representing a negative vying component of the original electrical signal; the optical path carrying the first and second varying optical signals to the demodulating means which converts them into the output electrical signal; the optical transmitter including a first optical modulator, a second optical modulator, and a light source associated with the first and second optical modulators, the light source being operable to produce an unmodulated optical output, and the first and second modulators being operable to intensity modulate the optical output in dependence on the original electrical signal to respectively produce the first and second varying optical signals, each modulator having an optical transmission versus voltage characteristic laving a substantially linear region and a threshold voltage above or below which substantially no light is transmitted by the respective modulator, and biasing means for biasing the first and second modulators to operate on a selected portion of said characteristic such that the first modulator is operable for positive varying components of the original electrical signal, and the second modulator is operable for negative varying components of the original electrical signal.

2. The optical link according to claim 1, in which the optical path comprises an optical fiber, and in which the light source is operable to produce a first wavelength light output which is applied to the first modulator, and a second wavelength light output which is applied to the second modulator such that the first and second varying optical signals have different wavelengths.

3. The optical link according to claim 1, in which the optical path comprises a polarizing maintaining optical fiber; and further comprising means for placing one of the varying optical signals in a different polarization state to that of the other before transmission along said fiber.

4. The optical link according to claim 3, in which the demodulating means includes a polarization splitter for distinguishing between the first and second varying optical signals.

5. The optical link according to claim 1, in which at least one of the modulators comprises an electro-absorption modulator.

6. The optical link according to claim 1, in which at least one of the modulators comprises a series of cascaded electro-optic modulators.

7. The optical link according to claim 1, in which the demodulating means comprises a first photoreceiver for converting the first varying optical signal into the positive varying component and a second photoreceiver for converting the second varying optical signal into the negative varying component, and means for combining the two components to produce the output electrical signal.

8. The optical link according to claim 7, in which the second photoreceiver extracts the negative varying component in anti-phase to the fir photoreceiver which extracts the positive varying component.

9. The optical link according to claim 1, in which the original electrical signal is selected from a group consisting of a microwave signal, a radar signal, and a communication signal.

* * * * *